(12) United States Patent
Meirosu et al.

(10) Patent No.: US 8,331,938 B2
(45) Date of Patent: Dec. 11, 2012

(54) MOVING USER EQUIPMENT WITHOUT SERVICE INTERRUPTION

(75) Inventors: Catalin Meirosu, Stockholm (SE); Said Soulhi, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 636 days.

(21) Appl. No.: 12/623,828

(22) Filed: Nov. 23, 2009

(65) Prior Publication Data

US 2011/0122845 A1    May 26, 2011

(51) Int. Cl.
    *H04W 36/00*    (2009.01)
(52) U.S. Cl. ........ 455/436; 455/438; 455/439; 455/453; 455/428; 455/437; 370/331
(58) Field of Classification Search .......... 455/436–445, 455/428, 522; 370/328, 331–335
    See application file for complete search history.

(56) References Cited

U.S. PATENT DOCUMENTS

| 7,623,885 | B2 * | 11/2009 | Vaittinen et al. | 455/522 |
| 7,813,319 | B2 * | 10/2010 | Dutta et al. | 370/331 |
| 8,045,525 | B1 * | 10/2011 | Bontu et al. | 370/331 |
| 2004/0053607 | A1 | 3/2004 | Ronneke | |
| 2004/0266438 | A1 | 12/2004 | Bjelland et al. | |
| 2011/0200011 | A1 * | 8/2011 | Rune | 370/331 |

FOREIGN PATENT DOCUMENTS

WO    WO 2004/084572 A1    9/2004

OTHER PUBLICATIONS

3GPP TS 23.401 version 9.2.0 Release 9; 3rd Generation Partnership Project; Technical Specification Group Service (GPRS) enhancements for Evolved Universal Terrestrial Radio Access Network (E-UTRAN) access (Release 9), Oct. 2009, URL: http://www.etsi.org/deliver/etsi_ts/123400_123499/123401/09.02.00_60/ts_123401v090200p.pdf.*
3GPP SA WG2 Architecture S2#63; S2-081491; Athens, Greece Feb. 18-22, 2008, CR 0179 on TS23.401; [retrieved from the internet Feb. 11, 2011, URL: http://www.3gpp.org/ftp/tsg_sa/WG2_Arch/TSGS2_63_Athens/docs/S2-081491.zip]; whole document.
3GPP TSG SA WG2 Meeting #63; TD S2-081490; Athens, Greece Feb. 18-22, 2008; Source: Nortel; Title: Load rebalancing mechanism; [retrieved from the internet Feb. 11, 2011, URL: http://www.3gpp.org/ftp/tsg_sa/WG2_Artch/TSGS_63_Athens/docs/S2-081490.zip]; whole documents.
International Search Report and Written Opinion of the International Searching Authority for International Application No. PCT/SE2010/051084; Date of Mailing: Feb. 17, 2011; 13 pages.

(Continued)

*Primary Examiner* — Kamran Afshar
*Assistant Examiner* — Shahriar Behnamian
(74) *Attorney, Agent, or Firm* — Myers Bigel Sibley & Sajovec, P.A.

(57) ABSTRACT

A device determines a user equipment, associated with the device, to move to a target device provided in a pool of other devices, where the user equipment has an ongoing session. The device also moves the user equipment to the target device, via a handover procedure and without interrupting the ongoing session, when the user equipment cannot be moved to the target device via direct signaling to the user equipment. The device further moves the user equipment to the target device, via direct signaling to the user equipment and without interrupting the ongoing session, when the user equipment can be moved to the target device via direct signaling to the user equipment.

25 Claims, 11 Drawing Sheets

OTHER PUBLICATIONS

3GPP TS 23.401 V8.6.0 (Jun. 2009) Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 8)", 227 pages.

3GPP TS 29.274 V8.1.1 (Mar. 2009) Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8), 116 pages.

Wieder, Udi, "Balanced Allocations with Heterogenous Bins", In Proceedings of the Nineteenth Annual ACM Symposium on Parallel Algorithms an Architectures (San Diego, California, USA, Jun. 9-11, 2007). SPAA '07, ACM, New York, NY, 11 pages.

Anagnostopoulos, Aris et al., "Stability and Efficiency of a Random Local Load Balancing Protocol", 2003, Proceedings of the 44th Annual IEEE Symposium on Foundations of Computer Science (Oct. 11-14, 2003). FOCS. IEEE Computer Society, Washington, D.C. 10 pages.

Azar, Yossi et al., "Balanced Allocations", in Proc. Of 26th STOC (1994), 593-602. Also in Siam J. Comput. vol. 29, No. 1, published Aug. 4, 1997, pp. 180-200.

Berenbrink, Petra et al., "Balanced Allocations: The Heavily Loaded Case", In Proceedings of the Thirty-Second Annual ACM Symposium on theory of Computing (Portland, Oregon, United States, May 21-23, 2000). STOC '00. ACM, New York, NY, 745-754, 11 pages.

Bestavros, Azer, "Load Profiling: A Methodology for Scheduling Real-Time Tasks in a Distributed System", In Proceedings of ICDCS '97: The IEEE International Conference on Distributed Computing Systems, Baltimore, Maryland, May 1997, 8 pages.

Dreibholtz, Thomas et al., "Implementing the Reliable Server Pooling Framework", 2005, in Proc. Of the IEEE International Conference on Telecommunications (conTEL 2005, Zagreb, Croatia, Jun. 2005, 8 pages.

Godfrey, P. Brighten, "Balls and Bins with Structure: Balanced Allocations on Hypergraphs", 2008, In Proceedings of the Nineteenth Annual ACM-SIAM Symposium on Discrete Algorithms (San Francisco, California, Jan. 20-22, 2008). Symposium on Discrete Algorithms. Society for industrial and Applied Mathematics, Philadelphia, PA 511-517, 7 pages.

Raab, Martin et al., "'Balls into Bins'—A Simple and Tight Analysis", 1998, In Proceedings of the Second international Workshop on Randomization and Approximation Techniques in Computer Science (Oct. 8-10, 1998). M. Luby, J.D. Rolim, and M.J. Serna, Eds. Lecture Notes in Computer Science, vol. 1518. Springer-Verlag, London, 159-170, 12 pages.

International Preliminary Report on Patentability for International Application No. PCT/SE2010/051084; Date of Mailing: Feb. 27, 2012; 13 pages.

3GPP TS 23.401 v9.2.0; Sep. 2009; 3rd Generation Partnership Project; Technical Specification Group Service (GPRS) enhancements for Evolved Universal Terrestrial Radio Access Network (E-UTRAN) access (Release 9), URL: http://www.3gpp.org/ftp/Specs/html-info/23401.htm 245 pages.

* cited by examiner

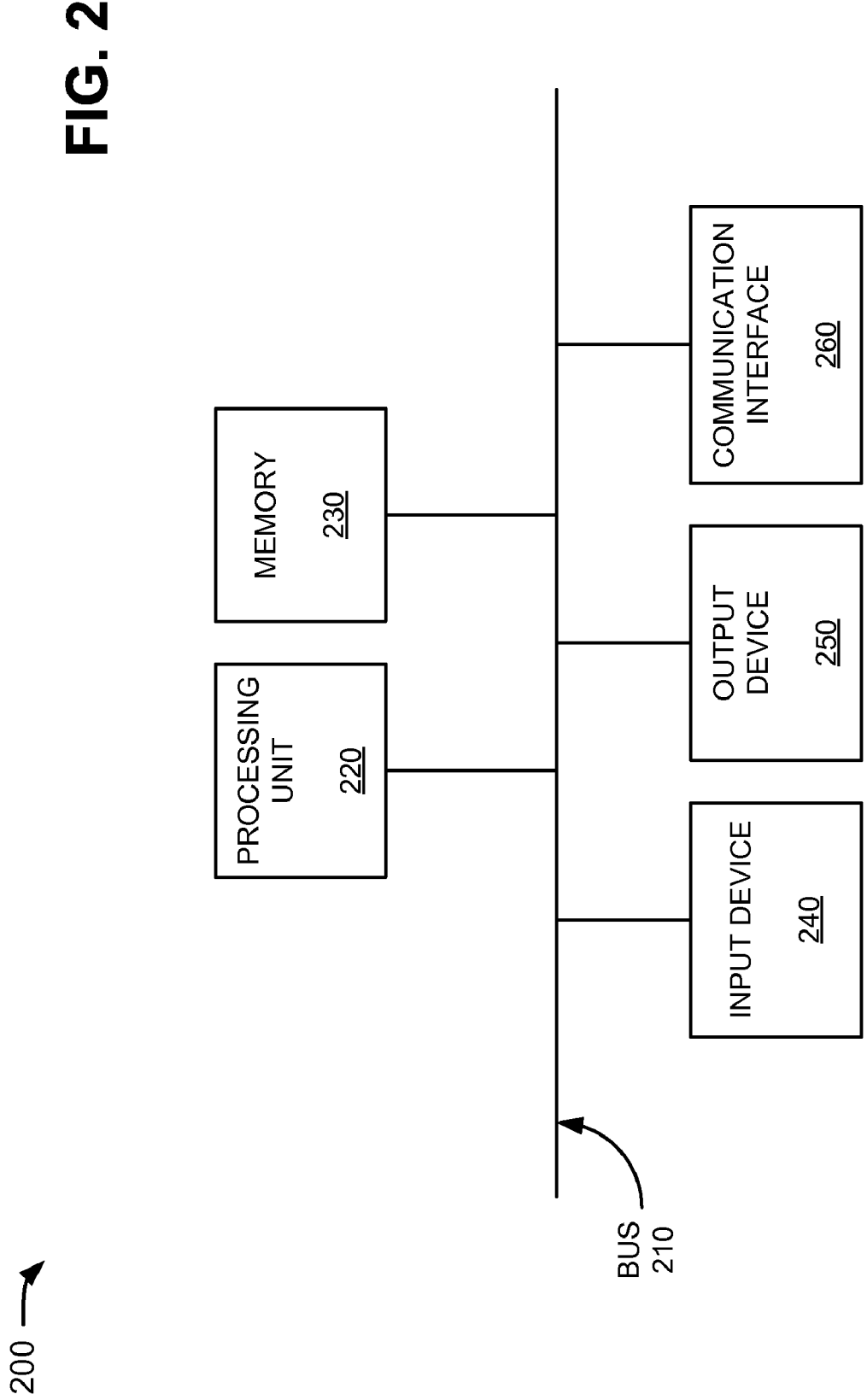

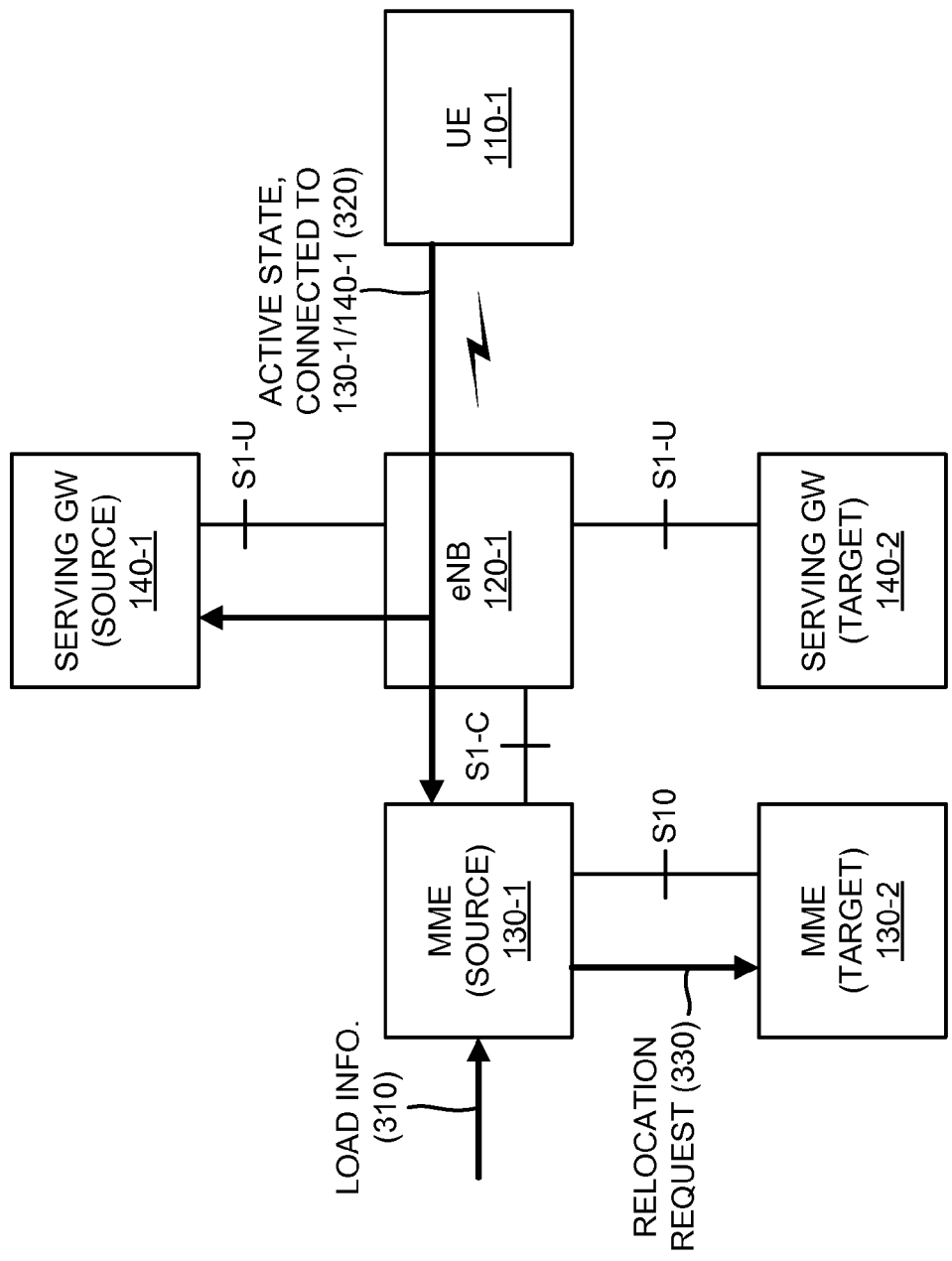

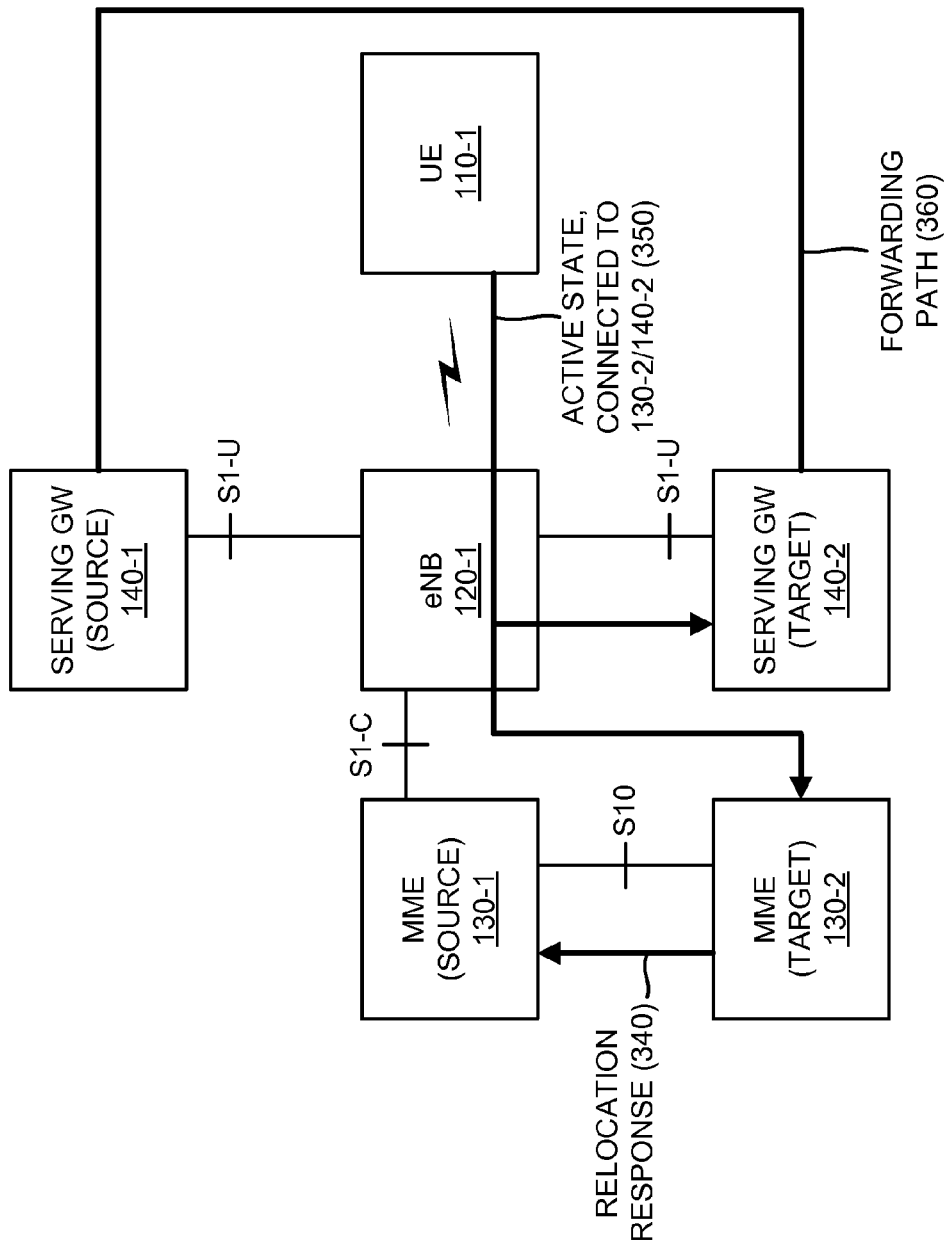

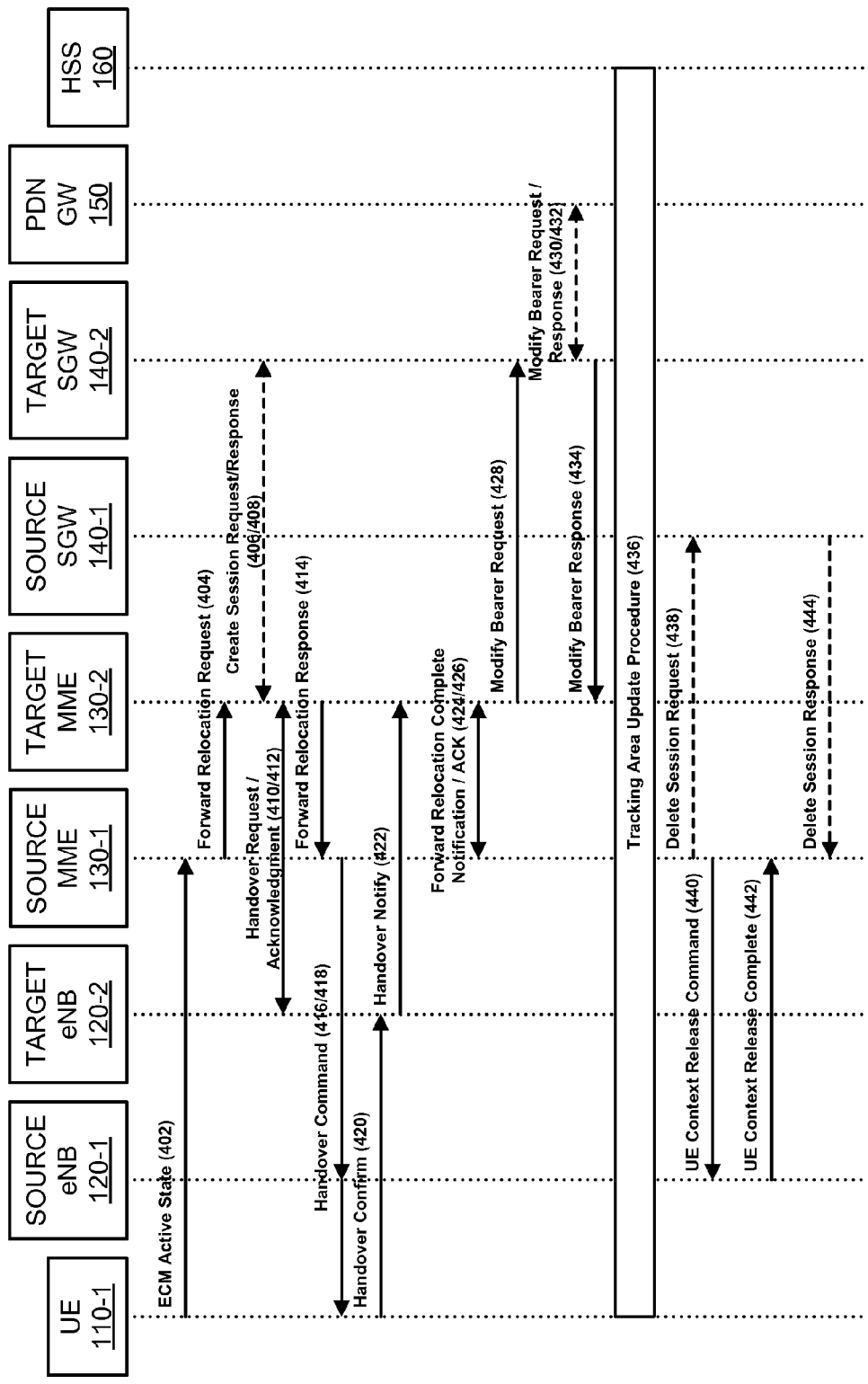

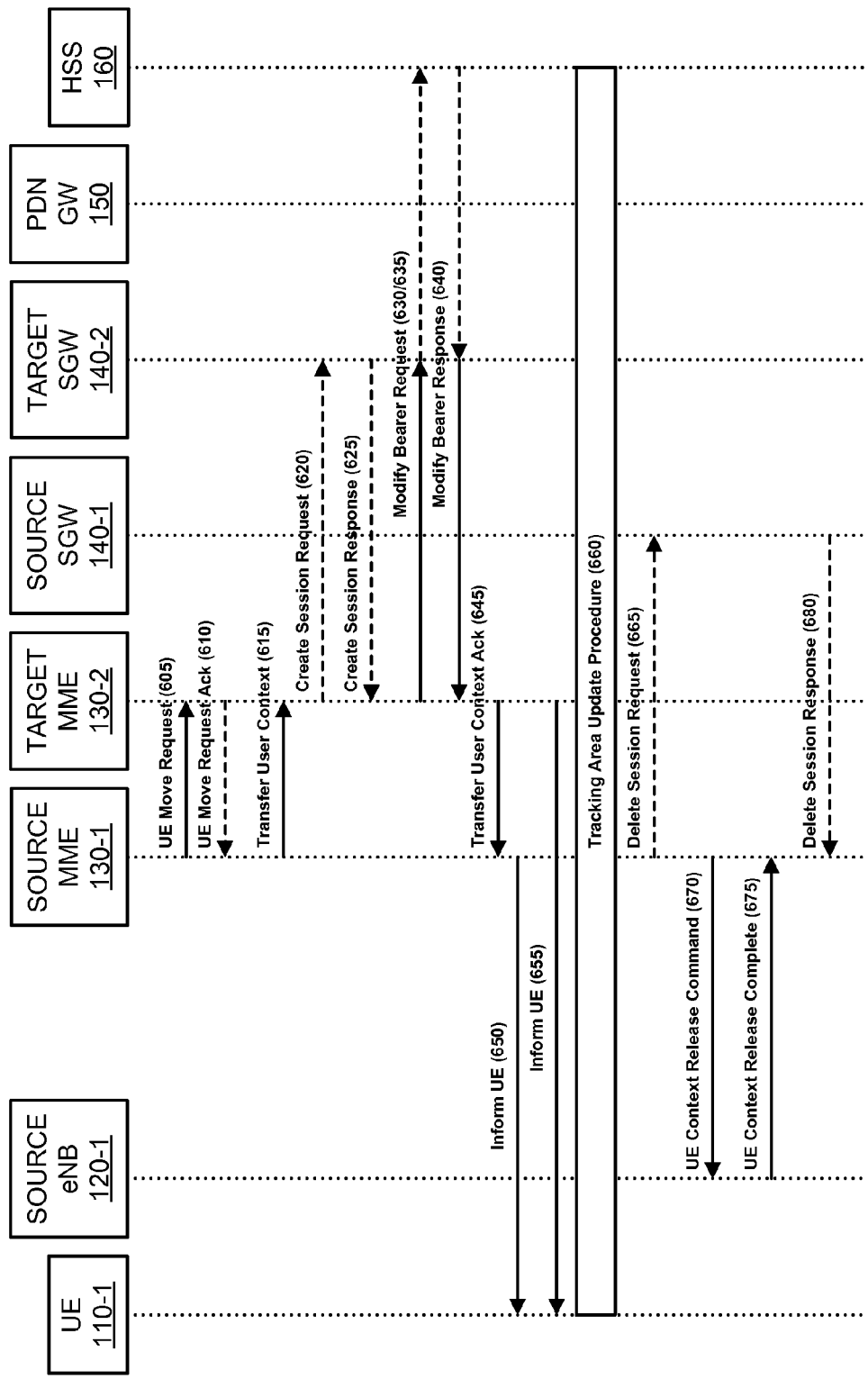

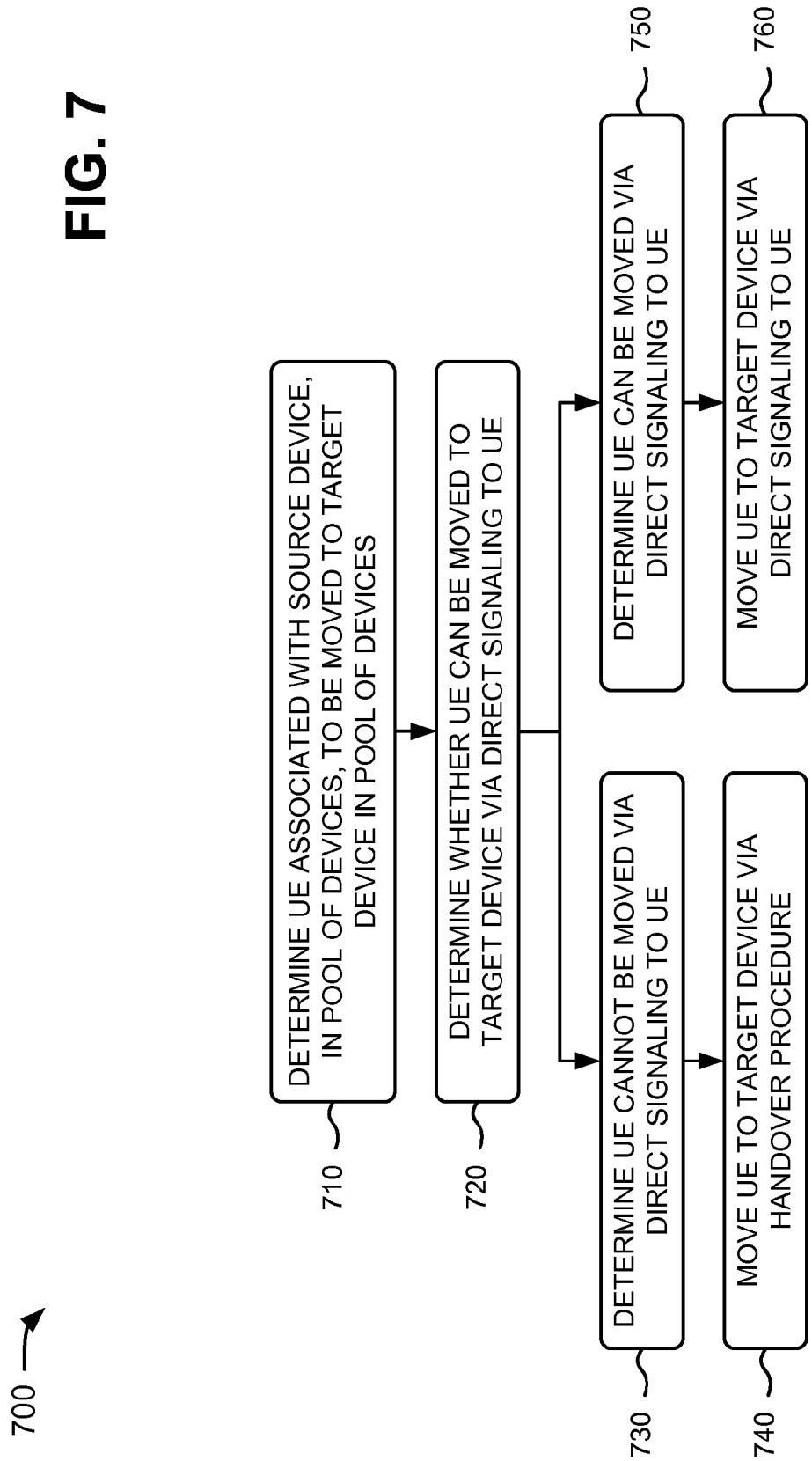

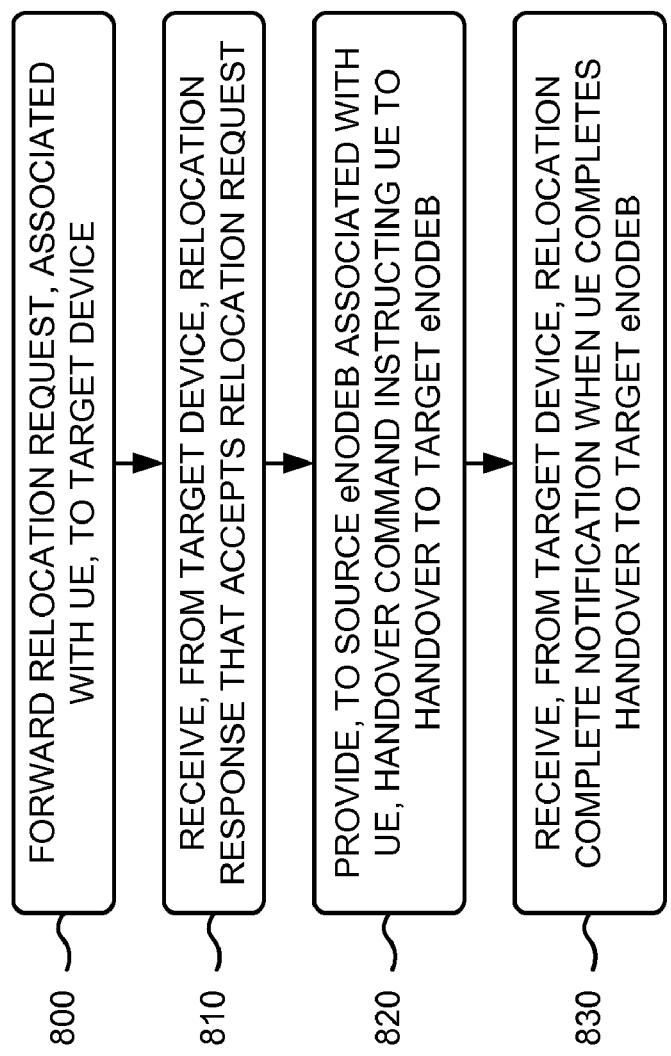

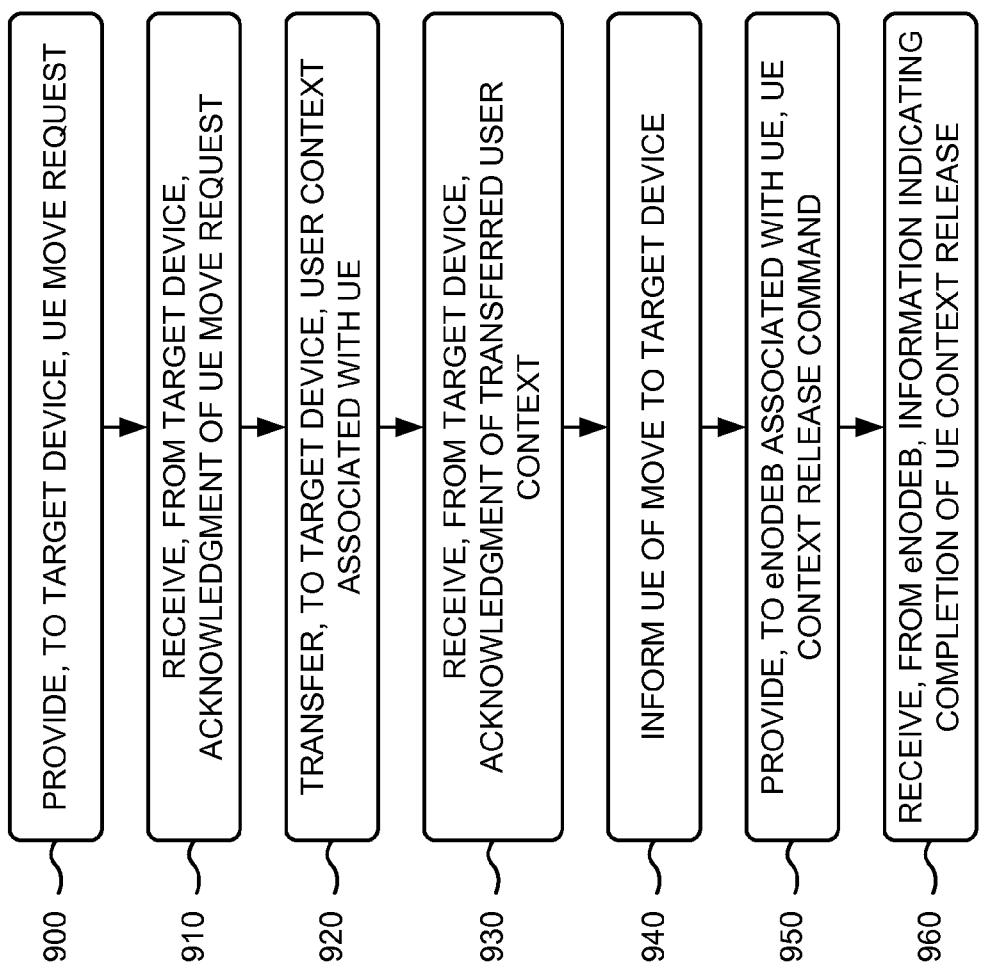

MOVING USER EQUIPMENT WITHOUT SERVICE INTERRUPTION

TECHNICAL FIELD

Embodiments described herein relate generally to communication systems, and, more particularly, to moving user equipment (UEs), in a telecommunication system, without service interruption.

BACKGROUND

The Third Generation Partnership Project (3GPP) technical specification (TS) 23.401 describes the behavior of a re-balancing function in a mobility management entity (MME). A MME is a device that hosts the following functions: non-access stratum (NAS) signaling; NAS signaling security; access server (AS) security control; inter-core network (CN) signaling for mobility between Third Generation Partnership Project (3GPP) access networks; idle mode user equipment (UE) reachability (including control and execution of paging retransmission); tracking area list management (for UEs in idle and active modes); public data network (PDN) gateway (GW) and serving GW selection; MME selection for handovers with MME change; serving general packet radio service (GPRS) support node (SGSN) selection for handovers to 3GPP access networks; roaming; authentication; bearer management functions (e.g., dedicated bearer establishment); support for earthquake and tsunami warning system (ETWS) message transmission; etc.

The MME pool architecture (e.g., defined by the 3GPP) enables radio network elements (e.g., eNodeBs) to decouple from interfacing with a single MME, and permits the radio network elements to access multiple MMEs grouped in a structure known as a "pool." MMEs communicate with each other via S10 interfaces, regardless of whether the MMEs are part of the same pool, different pools, or operate in isolation.

If it is necessary to move UEs from a source MME to a target MME within a same pool (e.g., prior to shutting down the source MME for maintenance purposes), the 3GPP TS 23.401 standard distinguishes between UEs in an in an evolved packet system (EPS) connection management (ECM) idle mode (e.g., an ECM_IDLE mode) and UEs in an ECM connected mode (e.g., ECM_CONNECTED mode). For a UE in the ECM connected mode, 3GPP TS 23.401 recommends that the source MME initiate a S1 release procedure with a release clause (e.g., "load balancing tracking area update (TAU) required"). After initiation of the release procedure, S1 interface connections and radio resource control (RRC) protocol-based connections (e.g., associated with the source MME) are released. The UE initiates a TAU and indicates to an eNodeB (eNB) (e.g., associated with the UE) that the RRC establishment is for load balancing purposes.

However, the S1 release procedure recommended by 3GPP TS 23.401 causes a service interruption for moved UEs in the ECM connected mode. Depending on what these UEs are actually doing before the move from the source MME to the target MME, a temporary discontinuation of service would affect most applications and cause performance degradation of, for example, voice, video, and/or file transfers by the UEs.

SUMMARY

It is an object of the invention to overcome at least some of the above disadvantages, and to provide systems and/or methods for moving a UE, in the ECM connected mode, between two MMEs (e.g. within the same MME pool) in a way that causes no (or minimal) service interruption for the moved UE and thus does not affect the user experience.

An embodiment described herein may provide a method in a network that includes a source device provided in a pool of devices. The method may include determining, by the source device, a user equipment, associated with the source device, to move to a target device provided in the pool of devices, where the user equipment has an ongoing session; and determining, by the source device, whether the user equipment can be moved to the target device via direct signaling to the user equipment. The method may also include moving, by the source device, the user equipment to the target device, via a handover procedure and without interrupting the ongoing session, when the user equipment cannot be moved to the target device via direct signaling to the user equipment; and moving, by the source device, the user equipment to the target device, via direct signaling to the user equipment and without interrupting the ongoing session, when the user equipment can be moved to the target device via direct signaling to the user equipment.

Another embodiment described herein may provide a device in a network that includes a pool of other devices associated with the device. The device may include a memory to store a group of instructions, and a processor to execute instructions in the memory to determine a user equipment, associated with the device, to move to a target device provided in the pool of other devices, where the user equipment has an ongoing session. The processor may also execute instructions in the memory to move the user equipment to the target device, via a handover procedure and without interrupting the ongoing session, when the user equipment cannot be moved to the target device via direct signaling to the user equipment. The processor may further execute instructions in the memory to move the user equipment to the target device, via direct signaling to the user equipment and without interrupting the ongoing session, when the user equipment can be moved to the target device via direct signaling to the user equipment.

Still another embodiment described herein may provide a system that includes a source mobility management entity (MME) and a target mobility management entity. The source mobility management entity may serve a user equipment with an ongoing session, may determine that the user equipment is to be moved to a target mobility management entity, and may determine whether the user equipment can be moved to the target mobility management entity via direct signaling to the user equipment. The source mobility management entity may also move the user equipment to the target mobility management entity, via a handover procedure and without interrupting the ongoing session, when the user equipment cannot be moved to the target mobility management entity via direct signaling to the user equipment. The source mobility management entity may further move the user equipment to the target mobility management entity, via direct signaling to the user equipment and without interrupting the ongoing session, when the user equipment can be moved to the target mobility management entity via direct signaling to the user equipment. The target mobility management entity may accept the move of the user equipment, and may serve the user equipment.

Systems and/or methods described herein may move a UE, while the UE is in an active mode (e.g., in an ECM connected mode), between two MMEs (e.g., within the same pool) in a way that causes no (or minimal) service interruption for the moved UE and thus does not affect the user experience. The systems and/or methods may be applied to UEs that are in an ECM connected mode (e.g., UEs with an ongoing session) but need to be moved from a MME (e.g., due to the MME requiring maintenance, load balancing, etc.). UEs in an ECM idle mode (e.g., inactive UEs) may be moved according to 3GPP procedures. When the systems and/or methods relocate a UE (e.g., due to load balancing), the UE may keep using the same radio resources (e.g., UE may maintain a connection with a particular eNB, but a MME and/or a serving gateway (GW) associated with the UE might change. The systems and/or methods may be initiated by a source MME (e.g., a MME from which the UE is moved), and the source MME may contact a target MME (e.g., a MME to which the UE is moved) to agree on the UE move. Once the UE is moved to the target MME, the eNB (e.g., associated with the UE) and the UE may be informed of the move so that the eNB and the UE may update their respective contexts. If a serving GW (e.g., associated with the UE) changes, the systems and/or methods may establish a forwarding path between a source serving GW (e.g., a serving GW from which the UE is moved) and a target serving GW (e.g., a serving GW to which the UE is moved).

The systems and/or methods may move the UE (e.g., to the target MME) in one of two ways. If the UE cannot be moved to the target MME via direct signaling to the UE, the systems and/or methods may move the UE to the target MME via a S1 handover-like procedure. The S1 handover-like procedure may permit use of signaling that is used for S1 handovers, and may take into consideration MMEs that are relocated. However, a procedure specified by the 3GPP for S1 handovers is initiated by an eNB associated with the UE to be moved. In contrast, the S1 handover-like procedure described herein may be initiated by a MME (e.g., the source MME) currently serving the UE to be moved. If the UE can be moved to the target MME via direct signaling to the UE, the systems and/or methods may move the UE to the target MME via direct signaling between the MME (e.g., and the eNB associated with the UE) and the UE.

BRIEF DESCRIPTION OF THE DRAWINGS

FIG. 2 is a diagram of exemplary components of a device that may correspond to one of the devices of the network depicted in FIG. 1;

FIGS. 3A and 3B are diagrams of exemplary interactions among components of an exemplary portion of the network illustrated in FIG. 1;

FIG. 4 depicts exemplary interactions among components of another exemplary portion of the network depicted in FIG. 1, during the S1 handover-like procedure;

FIG. 6 depicts exemplary interactions among components of yet another exemplary portion of the network depicted in FIG. 1, during the direct signaling procedure; and FIGS. 7-9 are flow charts of an exemplary process for moving a UE in the ECM connected mode between two MMEs in a way that causes no (or minimal) service interruption according to embodiments described herein.

DETAILED DESCRIPTION

The following detailed description refers to the accompanying drawings. The same reference numbers in different drawings may identify the same or similar elements. Also, the following detailed description does not limit the invention.

Figure 1:
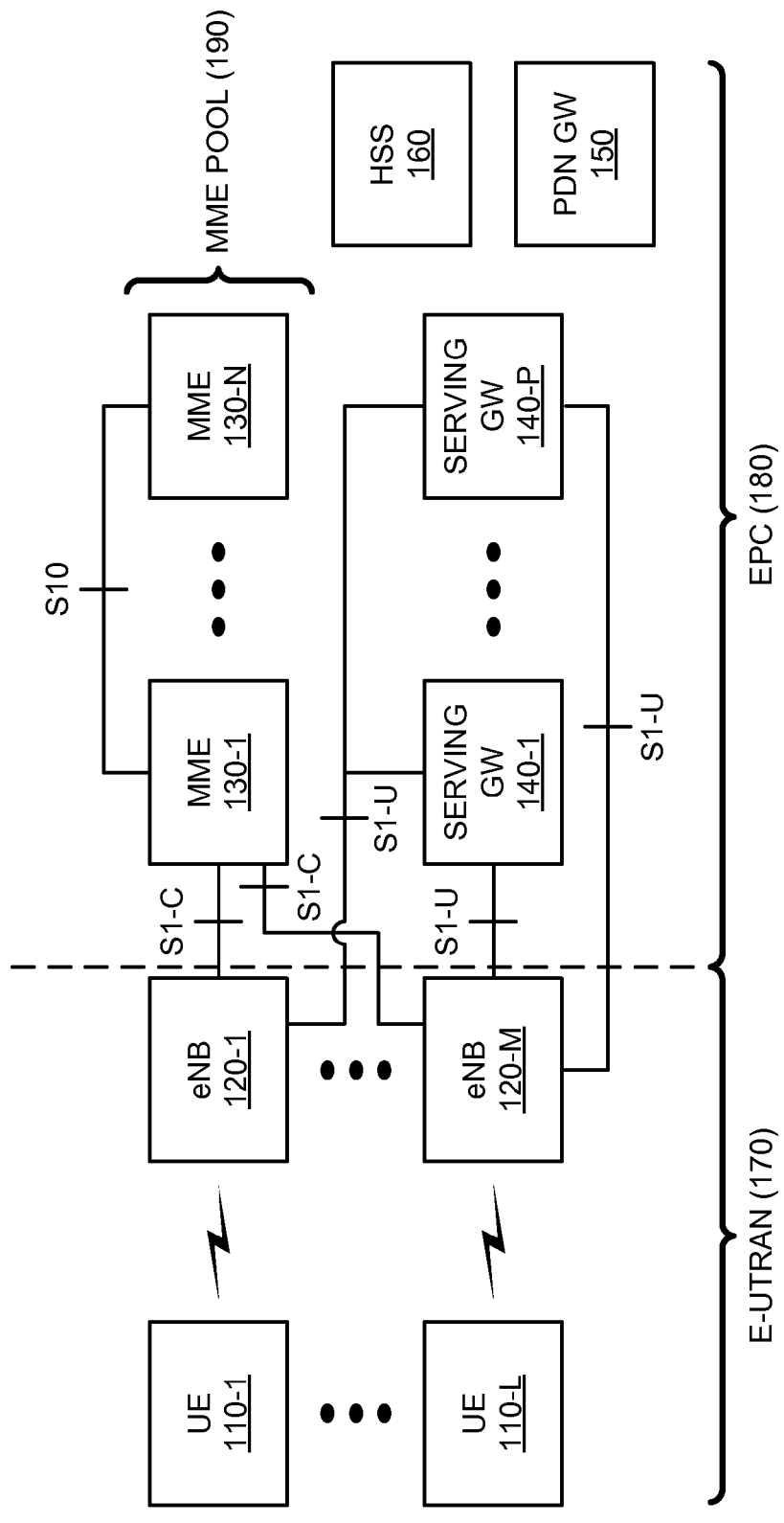
FIG. 1 is a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively as "UEs 110", and in some instances individually, as "UE 110"), a group of eNodeBs (eNBs) 120-1 through 120-M (referred to collectively as "eNBs 120" and in some instances, individually as "eNB 120"), a group of mobility management entities (MMEs) 130-1 through 130-N (referred to collectively as "MMEs 130" and in some instances, individually as "MME 130"), a group of serving gateways (GWs) 140-1 through 140-P (referred to collectively as "serving GWs 140" and in some instances, individually as "serving GW 140"), a public data network (PDN) gateway (GW) 150, and a home subscriber server (HSS) 160. As further shown, UEs 110 and eNBs 120 may be associated with an evolved universal terrestrial radio access network (E-UTRAN) 170; MMEs 130, serving GWs 140, PDN GW 150, and HSS 160 may be associated with an evolved packet core (EPC) network 180; and MMEs 130 may form a MME pool 190. Two UEs 110, two eNBs 120, two MMEs 130, two serving GWs 140, a single PDN GW 150, a single HSS 160, a single E-UTRAN 170, a single EPC network 180, and a single MME pool 190 have been illustrated in FIG. 1 for simplicity. In practice, there may be more UEs 110, eNBs 120, MMEs 130, serving GWs 140, PDN GWs 150, HSSs 160, E-UTRANs 170, EPC networks 180, and/or MME pools 190. Also, in some instances, one or more of the components of network 100 may perform one or more functions described as being performed by another one or more of the components of network 100.

UE 110 may include one or more computation and/or communication devices capable of sending/receiving voice and/or data to/from eNBs 120. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

eNB 120 may include one or more computation and/or communication devices that receive voice and/or data from one of MMEs 130 and/or serving GW 140 and transmit that voice and/or data to UE 110 via an air interface. eNB 120 may also include one or more devices that receive voice and/or data from UE 110 over an air interface and transmit that voice and/or data to one of MMEs 130, one of serving GWs 140, and/or other UEs 110.

MME 130 may include one or more computation and/or communication devices that control and manage eNBs 120. MME 130 may perform one or more of the following functions: NAS signaling; NAS signaling security; AS security control; inter-CN signaling for mobility between 3GPP access networks; idle mode UE reachability; tracking area list management (for UEs 110 in idle and active modes); serving GW 140 and PDN GW 150 selection; MME 130 selection for handovers with MME 130 change; SGSN selection for handovers to 3GPP access networks; roaming; authentication; bearer management functions; support for ETWS message transmission; etc.

In one exemplary embodiment, MME 130 (e.g., a source MME 130 serving one or more UEs 110 to be moved) may determine a particular UE 110 to move to a target MME 130 provided in a pool of MMEs 130, where the particular UE 110 may have an ongoing session (e.g., may be in an ECM connected mode). The source MME 130 may determine whether the particular UE 110 can be moved to the target MME 130 via direct signaling to the particular UE 110. The source MME 130 may move the particular UE 110 to the target MME 130, via a handover procedure (e.g., via the S1 handover-like procedure) and without interrupting the ongoing session, when the particular UE 110 cannot be moved to the target MME 130 via direct signaling to the particular UE 110. The source MME 130 may move the particular UE 110 to the target MME 130, via direct signaling to the particular UE 110 and without interrupting the ongoing session, when the particular UE 110 can be moved to the target MME 130 via direct signaling to the particular UE 110.

Serving GW 140 may include one or more computation and/or communication devices that route and forward user data packets to/from eNBs 120 and/or PDN GW 150, act as a mobility anchor for the user plane during inter-eNB handovers, and act as an anchor for mobility between long term evolution (LTE) and other 3GPP technologies.

PDN GW 150 may include one or more computation and/or communication devices that provide connectivity between UEs 110 and external packet data networks (e.g., network 160). PDN GW 150 may act as a point of entry and exit for traffic to UEs 110, may control IP data services, may perform routing, may allocate IP addresses, may provide access for non-3GPP access networks, and may enforce policies.

HSS 160 may include one or more computation and/or communication devices that provide a user database that supports Internet protocol (IP) multimedia subsystem (IMS) network entities that handle calls. The user database provided by HSS 160 may include subscription-related information (e.g., subscriber profiles), may perform authentication and authorization of a user, and may provide information about a subscriber's location and IP information.

As further shown in FIG. 1, eNBs 120 may interconnect with MMEs 130 via S1-C interfaces, and eNBs 120 may interconnect with serving GWs 140 via S1-U interfaces. MMEs 130 may interconnect via S10 interfaces.

Although FIG. 1 shows exemplary components of network 100, in other embodiments, network 100 may include fewer, different, differently arranged, or additional components than depicted in FIG. 1.

FIG. 2 illustrates a diagram of exemplary components of a device 200 that may correspond to one of the devices of network 100. As shown, device 200 may include a bus 210, a processing unit 220, a memory 230, an input device 240, an output device 250, and a communication interface 260.

Bus 210 may permit communication among the components of device 200. Processing unit 220 may include one or more processors and/or microprocessors that interpret and execute instructions. In some embodiments, processing unit 220 may be implemented as or include one or more application specific integrated circuits (ASICs), field programmable gate arrays (FPGAs), or the like. Memory 230 may include a random access memory (RAM) or another type of dynamic storage device that stores information and instructions for execution by processing unit 220, a read only memory (ROM) device and/or another type of static storage device that stores static information and instructions for the processing unit 220, a magnetic or optical recording medium and its corresponding drive for storing information and/or instructions, and/or other types of memory.

Input device 240 may include a device that permits an operator to input information to device 200, such as a keyboard, a keypad, a mouse, a pen, a microphone, one or more biometric mechanisms, and the like. Output device 250 may include a device that outputs information to the operator, including a display, a printer, a speaker, etc.

Communication interface 260 may include any transceiver-like mechanism that enables device 200 to communicate with other devices and/or systems. For example, communication interface 260 may include mechanisms for communicating with another device or system via a network.

As described herein, device 200 may perform certain operations in response to processing unit 220 executing software instructions contained in a computer-readable medium, such as main memory 230. A computer-readable medium may be defined as one or more physical and/or logical memory devices. A logical memory device may include a space within a single physical memory device or spread across multiple physical memory devices. The software instructions may be read into memory 230 from another computer-readable medium or from another device via communication interface 260. The software instructions contained in memory 230 may cause processing unit 220 to perform processes that will be described later. Alternatively, hardwired circuitry may be used in place of or in combination with software instructions to implement processes described herein. Thus, systems and/or methods described herein are not limited to any specific combination of hardware circuitry and software.

Although FIG. 2 shows exemplary components of device 200, in other implementations, device 200 may contain fewer, different, differently arranged, or additional components than depicted in FIG. 2. Additionally or alternatively, one or more components of device 200 may perform one or more other tasks described as being performed by one or more other components of device 200.

FIGS. 3A and 3B depict diagrams of exemplary interactions among components of an exemplary portion 300 of network 100. As illustrated, exemplary network portion 300 may include UE 110-1, eNB 120-1, MMEs 130-1 and 130-2, and serving GWs 140-1 and 140-2. UE 110-1, eNB 120-1, MMEs 130-1 and 130-2, and serving GWs 140-1 and 140-2 may include the features described above in connection with, for example, FIGS. 1 and 2.

As further shown in FIG. 3A, MME 130-1 may be a source MME for UE 110-1, MME 130-2 may be a target MME to which UE 110-1 may be moved, and MMEs 130-1 and 130-2 may be associated with the same MME pool (e.g., MME pool 190). Source MME 130-1 may receive load information 310. Load information 310 may include momentary loads (e.g., a number of active calls and/or sessions associated with MMEs 130, a number of users (UEs 110) registered in MMEs 130, etc.) associated with MMEs 130 (e.g., MMEs 130-1 and 130-2). UE 110-1 may be in an active state or mode (e.g., an ECM connected mode) and may be connected to eNB 120-1 and source MME 130-1, as indicated by reference number 320. Source MME 130-1 may determine a particular UE 110 (e.g., UE 110-1) to move to target MME 130-2. Source MME 130-1 may determine that UE 110-1 needs to be moved to target MME 130-2 for a variety of reasons (e.g., because source MME 130-1 is scheduled for a maintenance operation, because source MME 130-1 is taken offline, for load balancing purposes and based on load information 310, etc.). In one example, source MME 130-1 may detect a load imbalance on source MME 130-1 based on load information 310, and may select, based on the load imbalance, target MME 130-2 to which to move UE 110-1.

Source MME 130-1 may determine whether UE 110-1 can be moved to target MME 130-2 via direct signaling to UE 110-1. When UE 110-1 cannot be moved to target MME 130-2 via direct signaling to UE 110-1, source MME 130-1 may move UE 110-1 to target MME 130-2, via a handover procedure (e.g., via the S1 handover-like procedure) and without interrupting the ongoing session (e.g., UE's 110-1 active state 320). As shown in FIG. 3A, source MME 130-1 may provide a relocation request 330 to target MME 130-2. Relocation request 330 may include information indicating that source MME 130-1 wants to move UE 110-1 to target MME 130-2, information associated with UE 110-1 (e.g., a load associated with UE 110-1), etc. Target MME 130-2 may receive relocation request 330, and may determine whether it can accept the move of UE 110-1 to target MME 130-2 based on relocation request 330. In one exemplary embodiment, source MME 130-1 and target MME 130-2 may negotiate a move of UEs 110. For example, source MME 130-1 may request target MME 130-2 to accept a move of ten UEs 110, and target MME 130-2 may only agree to accept a move of seven UEs 110 (e.g., due to a load associated with MME 130-2).

As shown in FIG. 3B, if target MME 130-2 can accept the move of UE 110-1, target MME 130-2 may provide a relocation response 340 (e.g., indicating that target MME 130-2 can accept the move of UE 110-1) to source MME 130-1. Source MME 130-1 may receive relocation response 340, and may move UE 110-1 to target MME 130-2 based on relocation response 340. UE 110-1 may remain in an active state (e.g., an ECM connected mode) and may be connected to target MME 130-2 and serving GW 140-2, as indicated by reference number 350. UE 110-1 may experience no (or minimal) service interruption during the move. Once UE 110-1 is moved to target MME 130-2, eNB 120-1 (e.g., associated with UE 110-1) and UE 110-1 may be informed of the move (e.g., by source MME 130-1) so that eNB 120-1 and UE 110-1 may update their respective contexts. If a serving GW (e.g., associated with UE 110-1) changes from serving GW 140-1 to serving GW 140-2 based on the move, serving GW 140-1 may establish a forwarding path 360 between serving GW 140-1 and serving GW 140-2. Forwarding path 360 may enable serving GWs 140-1 and 140-2 to exchange information (e.g., associated with UE 110-1, eNB 120-1, etc.).

Although FIGS. 3A and 3B show exemplary components of network portion 300, in other implementations, network portion 300 may contain fewer, different, differently arranged, or additional components than depicted in FIGS. 3A and 3B. Additionally or alternatively, one or more components of network portion 300 may perform one or more other tasks described as being performed by one or more other components of network portion 300.

FIG. 4 illustrates exemplary interactions among components of another exemplary portion 400 of network 100, during the S1 handover-like procedure. As illustrated, exemplary network portion 400 may include UE 110-1, a source eNB 120-1, a target eNB 120-2, a source MME 130-1, a target MME 130-2, a source serving GW (SGW) 140-1, a target serving GW 140-2, PDN GW 150, and HSS 160. UE 110-1, source eNB 120-1, target eNB 120-2, source MME 130-1, target MME 130-2, source serving GW 140-1, target serving GW 140-2, PDN GW 150, and HSS 160 may include the features described above in connection with, for example, FIGS. 1-3B.

As shown in FIG. 4, UE 110-1 may be in an ECM active state 402 with source MME 130-1. Source MME 130-1 may select target MME 130-2 (e.g., as described above in connection with FIGS. 3A and 3B), and may send a forward relocation request message 404 to target MME 130-2. Forward relocation request message 404 may include a MME/UE context, a source to target transparent container, a radio access network (RAN) cause, a target eNB 120-2 identity, a direct forwarding flag, etc. The transparent container may include: a target cell ID (e.g., a current serving cell so that source MME knows which eNB is serving UE 110-1); an E-UTRAN radio access bearer (E-RAB) ID; a RRC container (e.g., which may include radio access capability information associated with UE 110-1); UE 110-1 history information; etc. The RAN cause may indicate that UE 110-1 is being moved based on load balancing. In one example, the RAN cause may include a cause information element (IE) with a radio network layer cause set to "Load Balancing TAU Required." In another example, the RAN cause may include a cause IE with a miscellaneous cause set to "O&M Intervention." The direct forwarding flag may indicate if direct forwarding is applied, or if indirect forwarding is going to be set up by source MME 130-1. The direct forwarding flag may be set to "yes" (or "on") to indicate that there will be no change in the eNB serving UE 110-1.

Target MME 130-2 may verify whether source serving GW 140-1 can continue to serve UE 110-1. If not, target MME 130-2 may select a new serving GW (e.g., target serving GW 140-2). If target serving GW 140-2 is selected, target MME 130-2 may send a create session request message 406 to target serving GW 140-2. Create session request message 406 may include bearer context(s) with PDN GW 150, addresses, keys at the PDN GW 150, etc. Target serving GW 140-2 may allocate the addresses for uplink traffic, and may send a create session response 408 to target MME 130-2. Create session response message 408 may include serving GW addresses. If source serving GW 140-1 continues to serve UE 110-1, messages 406 and 408 may be omitted.

As further shown in FIG. 4, target MME 130-2 may send a handover request message 410 to target eNB 120-2. Handover request message 410 may include EPS bearers to setup, a SLAP cause, a source to target transparent container, a handover restriction list, etc. Handover request message 410 may create the UE context in target eNB 120-2 and may include information about bearers and a security context. Target eNB 120-2 may need to make sure that if target eNB 120-2 already has allocated the bearers to UE 110-1, target eNB 120-2 interprets message 410 as a notification of a load balancing procedure in target MME 130-2. Target eNB 120-2 may send a handover request acknowledgement 412 to target MME 130-2. Handover request acknowledgement 412 may include an EPS bearer setup result, a target to source transparent container, etc. The EPS bearer setup result may include a list of rejected EPS bearers and a list of addresses allocated at target eNB 120-2 for downlink traffic and addresses for receiving forwarded data.

Target MME 130-2 may send a forward relocation response message 414 to source MME 130-1. Forward relocation response message 414 may include a cause, a target to source transparent container, a serving GW change indication, EPS bearer setup result, addresses, etc. In one example, no indirect forwarding may be used by target MME 130-2.

Source MME 130-1 may send a handover command message 416 to source eNB 120-1 and source eNB 120-1 may forward 418 handover command message 416 to UE 110-1. Handover command message 416 may include a target to source transparent container, information identifying bearers subject to forwarding, information identifying bearers to release, etc. Upon reception of handover command message 416, UE 110-1 may remove any EPS bearers for which it did not receive corresponding EPS radio bearers in target eNB 120-2.

After UE 110-1 has successfully synchronized to target eNB 120-2, UE 110-1 may send a handover confirm message 420 to target eNB 120-2. Downlink packets may be forwarded from source eNB 120-1 and may be sent to UE 110-1. Uplink packets may be sent from UE 110-1 and may be forwarded to target serving GW 140-2 and to PDN GW 150. Target eNB 120-2 may send a handover notify message 422 to target MME 130-2. Target MME 130-2 may send a forward relocation complete notification message 424 to source MME 130-1. In response, source MME 130-1 may send a forward relocation complete acknowledgement message 426 to target MME 130-2.

As further shown in FIG. 4, target MME 130-2 may send a modify bearer request message 428 to target serving GW 140-2 for each PDN connection. Modify bearer request message 428 may include an address allocated at target eNB 120-2 for downlink traffic, user location information, etc. If a serving GW is relocated, target serving GW 140-2 may assign addresses for downlink traffic from PDN GW 150. Target serving GW 140-2 may send a modify bearer request message 430 to PDN GW 150. Modify bearer request message 430 may include serving GW addresses for the user plane, etc. PDN GW 150 may update its context field and may return a modify bearer response message 432 to target serving GW 140-2. Modify bearer response message 432 may include PDN GW 150 addresses, a charging ID, etc. PDN GW 150 may start sending downlink packets to target serving GW 140-2 using the newly received addresses. The downlink packets may use a new downlink path provided between target serving GW 140-2 and target eNB 120-2. Target serving GW 140-2 may send a modify bearer response message 434 to target MME 130-2. Modify bearer response message 434 may include PDN GW 150 addresses, keys at PDN GW 150 for uplink traffic, etc.

UE 110-1 may initiate a tracking area update (TAU) procedure 436. Target MME 130-2 may know that a handover procedure has been performed for UE 110-1 since target MME 130-2 received bearer contexts by handover messages. Therefore, target MME 130-2 may perform only a subset of TAU procedure 436, and may specifically exclude context transfer procedures between source MME 130-1 and target MME 130-2.

When a timer (e.g., started via forward relocation complete notification message 424) expires and if source MME 130-1 received a serving GW change indication in forward relocation response message 414, source MME 130-1 may delete EPS bearer resources by sending a delete session request message 438 to source serving GW 140-1. Source MME 130-1 may provide a UE context release command message 440 (e.g., requesting release of UE 110-1 context) to source eNB 120-1. Source eNB 120-1 may release UE 110-1 context and may provide a UE context release complete command 442 to source MME 130-1. Source serving GW may acknowledge delete session request message 438 with a delete session response message 444.

Although FIG. 4 shows exemplary components of network portion 400, in other implementations, network portion 400 may contain fewer, different, differently arranged, or additional components than depicted in FIG. 4. Additionally or alternatively, one or more components of network portion 400 may perform one or more other tasks described as being performed by one or more other components of network portion 400. In one exemplary embodiment, network portion 400 may perform additional steps set forth in the 3GPP procedure for S1 handovers (e.g., see 3GPP TS 23.401).

Figure 5A:
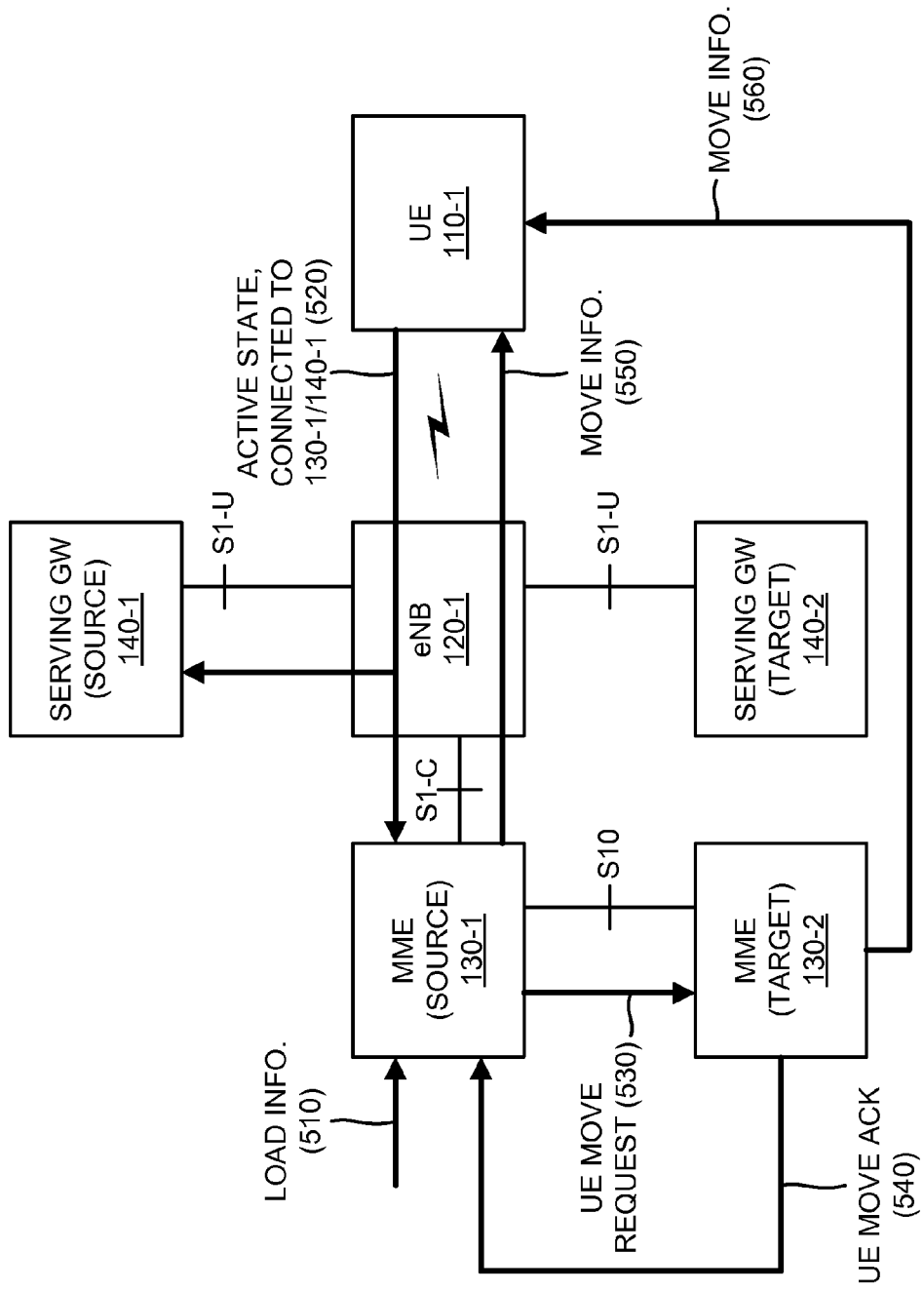
FIGS. 5A and 5B are diagrams of exemplary interactions among components of still another exemplary portion of the network illustrated in FIG. 1.
Figure 5B:
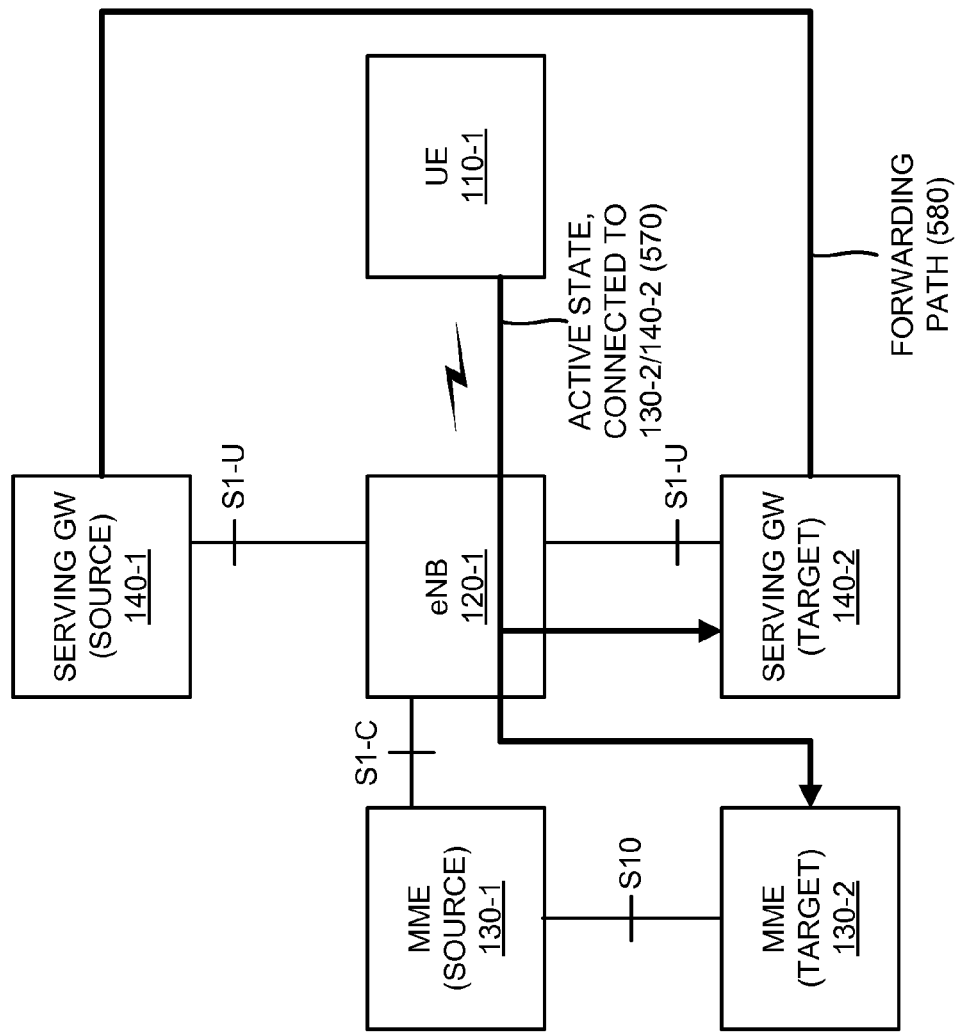

FIGS. 5A and 5B depict diagrams of exemplary interactions among components of still another exemplary portion 500 of network 100. As illustrated, exemplary network portion 500 may include UE 110-1, eNB 120-1, MMEs 130-1 and 130-2, and serving GWs 140-1 and 140-2. UE 110-1, eNB 120-1, MMEs 130-1 and 130-2, and serving GWs 140-1 and 140-2 may include the features described above in connection with, for example, FIGS. 1 and 2.

As further shown in FIG. 5A, MME 130-1 may be a source MME for UE 110-1, MME 130-2 may be a target MME to which UE 110-1 may be moved, and MMEs 130-1 and 130-2 may be associated with the same MME pool (e.g., MME pool 190). Source MME 130-1 may receive load information 510. Load information 510 may include momentary loads (e.g., a number of active calls and/or sessions associated with MMEs 130, a number of users (UEs 110) registered in MMEs 130, etc.) associated with MMEs 130 (e.g., MMEs 130-1 and 130-2). UE 110-1 may be in an active state or mode (e.g., an ECM connected mode) and may be connected to eNB 120-1 and source MME 130-1, as indicated by reference number 520. Source MME 130-1 may determine a particular UE 110 (e.g., UE 110-1) to move to target MME 130-2. Source MME 130-1 may determine that UE 110-1 needs to be moved to target MME 130-2 for a variety of reasons (e.g., because source MME 130-1 is scheduled for a maintenance operation, because source MME 130-1 is taken offline, for load balancing purposes and based on load information 510, etc.). In one example, source MME 130-1 may detect a load imbalance on source MME 130-1 based on load information 510, and may select, based on the load imbalance, target MME 130-2 to which to move UE 110-1.

Source MME 130-1 may determine whether UE 110-1 can be moved to target MME 130-2 via direct signaling to UE 110-1. When UE 110-1 can be moved to target MME 130-2 via direct signaling to UE 110-1, source MME 130-1 may move UE 110-1 to target MME 130-2, via direct signaling to UE 110-1 and without interrupting the ongoing session (e.g., UE's 110-1 active state 520). As shown in FIG. 5A, source MME 130-1 may provide a UE move request 530 to target MME 130-2. UE move request 530 may include information indicating that source MME 130-1 wants to move UE 110-1 to target MME 130-2, information associated with UE 110-1 (e.g., a load associated with UE 110-1), etc. Target MME 130-2 may receive UE move request 530, and may determine whether it can accept the move of UE 110-1 to target MME 130-2 based on UE move request 530. In one exemplary embodiment, source MME 130-1 and target MME 130-2 may negotiate a move of UEs 110.

As further shown in FIG. 5A, if target MME 130-2 can accept the move of UE 110-1, target MME 130-2 may provide a UE move acknowledgement 540 (e.g., indicating that target MME 130-2 can accept the move of UE 110-1) to source MME 130-1. Source MME 130-1 may receive UE move acknowledgement 540, and may provide move information 550 to UE 110-1. Target MME 130-2 may provide move information 560 to UE 110-1. Move information 550 and 560 may include information associated with how UE 110-1 will be moved from source MME 130-1 to target MME 130-2. For example, move information 550/560 may specify parameters that may cause UE 110-1 to switch from being associated with source MME 130-1 to being associated with target MME 130-2. UE 110-1 may move from source MME 130-1 to target MME 130-2 based on move information 550/560.

As shown in FIG. 5B, after UE 110-1 is moved from source MME 130-1 to target MME 130-2, UE 110-1 may remain in an active state (e.g., an ECM connected mode) and may be connected to target MME 130-2 and serving GW 140-2, as indicated by reference number 570. UE 110-1 may experience no (or minimal) service interruption during the move. Once UE 110-1 is moved to target MME 130-2, eNB 120-1 (e.g., associated with UE 110-1) and UE 110-1 may be informed of the move (e.g., by source MME 130-1) so that eNB 120-1 and UE 110-1 may update their respective contexts. If a serving GW (e.g., associated with UE 110-1) changes from serving GW 140-1 to serving GW 140-2 based on the move, serving GW 140-1 may establish a forwarding path 580 between serving GW 140-1 and serving GW 140-2. Forwarding path 580 may enable serving GWs 140-1 and 140-2 to exchange information (e.g., associated with UE 110-1, eNB 120-1, etc.).

Although FIGS. 5A and 5B show exemplary components of network portion 500, in other implementations, network portion 500 may contain fewer, different, differently arranged, or additional components than depicted in FIGS. 5A and 5B. Additionally or alternatively, one or more components of network portion 500 may perform one or more other tasks described as being performed by one or more other components of network portion 500.

FIG. 6 illustrates exemplary interactions among components of yet another exemplary portion 600 of network 100 during the direct signaling procedure. As illustrated, exemplary network portion 600 may include UE 110-1, source eNB 120-1, source MME 130-1, target MME 130-2, source serving GW (SGW) 140-1, target serving GW 140-2, PDN GW 150, and HSS 160. UE 110-1, source eNB 120-1, source MME 130-1, target MME 130-2, source serving GW (SGW) 140-1, target serving GW 140-2, PDN GW 150, and HSS 160 may include the features described above in connection with, for example, FIGS. 1, 2, 5A, and 5B.

As shown in FIG. 6, source MME 130-1 may select target MME 130-2 (e.g., based on load balancing) and may send a UE move request message 605 to target MME 130-2. UE move request message 605 may include information requesting a move of UE 110-1 to target MME 130-2. Target MME 130-2 may reply to UE move request message 605 with a UE move request acknowledgement message 610. If UE move request acknowledgement message 610 indicates that target MME 130-2 can accept UE 110-1, then source MME 130-1 may send a UE move transfer user context message 615 to target MME 130-2. UE move transfer user context message 615 may include an international mobile subscriber identity (IMSI), a MME Identity, a UE security context, UE network capability, an aggregate maximum bit rate (AMBR), a selected operator ID, an access point name (APN) restriction, a serving GW address and tunnel endpoint identifier (TEID) for control signaling, EPS bearer contexts, and/or other information. An EPS bearer context may include PDN GW 150 addresses and TEIDs or keys at PDN GW 150 for uplink traffic, an APN, serving GW addresses and TEIDs for uplink traffic, and a transaction identifier (TI).

Target MME 130-2 may verify whether source serving GW 140-1 can continue to serve UE 110-1. If source serving GW 140-1 cannot continue to serve UE 110-1, target MME 130-2 may select target serving GW 140-2 to serve UE 110-1. Target MME 130-2 may send a create session request message 620 to target serving GW 140-2. Create session request message 620 may include, for example, bearer contexts with PDN GW 150 addresses and TEIDs or keys at PDN GW 150 for uplink traffic. Target serving GW 140-2 may allocate serving GW addresses and TEIDs for the uplink traffic. Target serving GW 140-2 may send a create session response message 625 back to target MME 130-2. Create session response message 625 may include, for example, serving GW addresses and uplink TEIDs for the user plane. If source serving GW 140-1 continues to serve UE 110-1, messages 620 and 625 may be omitted.

As further shown in FIG. 6, target MME 130-2 may send a modify bearer request message 630 to target serving GW 140-2 for each PDN connection. Modify bearer request message 630 may include user location information, etc. If a serving GW is relocated, target serving GW 140-2 may assign addresses for downlink traffic from PDN GW 150. Target serving GW 140-2 may send a modify bearer request message 635 to PDN GW 150. Modify bearer request message 635 may include serving GW addresses for the user plane, etc. PDN GW 150 may update its context field and may return a modify bearer response message 640 to target serving GW 140-2. Modify bearer response message 640 may include PDN GW 150 addresses, a charging ID, keys at PDN GW 150 for uplink traffic, etc. PDN GW 150 may start sending downlink packets to target serving GW 140-2 using the newly received addresses. The downlink packets may use a new downlink path provided between target serving GW 140-2 and target eNB 120-2. Target serving GW 140-2 may forward modify bearer response message 640 to target MME 130-2.

Target MME 130-2 may send a transfer user context acknowledgement message 645 to source MME 130-1. Transfer user context acknowledgement message 645 may include a cause, a target to source transparent container, a serving GW change indication, an EPS bearer setup result, addresses, TEIDs, etc. Source MME 130-1 may inform UE 110-1 (e.g., as indicated by reference number 650) of the move to target MME 130-2, and target MME 130-2 may inform UE 110-1 (e.g., as indicated by reference number 655) of the move. For example, as described above in connection with FIG. 5A, source MME 130-1 may provide move information 550 to UE 110-1 and target MME 130-2 may provide move information 560 to UE 110-1.

UE 110-1 may initiate a tracking area update (TAU) procedure 660. Target MME 130-2 may know that a handover procedure has been performed for UE 110-1 since target MME 130-2 received bearer contexts by handover messages. Therefore, target MME 130-2 may perform only a subset of TAU procedure 660, and may specifically exclude context transfer procedures between source MME 130-1 and target MME 130-2.

Source MME 130-1 may delete EPS bearer resources by sending a delete session request message 665 to source serving GW 140-1. Source MME 130-1 may provide a UE context release command message 670 (e.g., requesting release of UE 110-1 context) to source eNB 120-1. Source eNB 120-1 may release UE 110-1 context and may provide a UE context release complete command 675 to source MME 130-1. Source serving GW may acknowledge delete session request message 665 with a delete session response message 680.

Although FIG. 6 shows exemplary components of network portion 600, in other implementations, network portion 600 may contain fewer, different, differently arranged, or additional components than depicted in FIG. 6. Additionally or alternatively, one or more components of network portion 600 may perform one or more other tasks described as being performed by one or more other components of network portion 600.

FIGS. 7-9 depict flow charts of an exemplary process 700 for moving a UE in an ECM connected mode between two MMEs in a way that causes no (or minimal) service interruption according to embodiments described herein. In one embodiment, process 700 may be performed by one of MMEs 130 (e.g., a source MME 130). In other embodiments, some or all of process 700 may be performed by another device or group of devices (e.g., communicating with one of MMEs 130).

As illustrated in FIG. 7, process 700 may include determining a UE associated with a source device, in a pool of devices, to be moved to a target device in the pool of devices (block 710), and determining whether the UE can be moved to the target device via direct signaling to the UE (block 720). For example, in embodiments described above in connection with FIG. 3A, source MME 130-1 may determine a particular UE 110 (e.g., UE 110-1) to move to target MME 130-2. Source MME 130-1 may determine that UE 110-1 needs to be moved to target MME 130-2 for a variety of reasons (e.g., because source MME 130-1 is scheduled for a maintenance operation, because source MME 130-1 is taken offline, for load balancing purposes and based on load information 310, etc.). In one example, source MME 130-1 may detect a load imbalance on source MME 130-1 based on load information 310, and may select, based on the load imbalance, target MME 130-2 to which to move UE 110-1. Source MME 130-1 may determine whether UE 110-1 can be moved to target MME 130-2 via direct signaling to UE 110-1.

As further shown in FIG. 7, it may determined that the UE cannot be moved via direct signaling to the UE (block 730), and the UE may be moved to the target device via a handover procedure (block 740). For example, in embodiments described above in connection with FIGS. 3A and 3B, when UE 110-1 cannot be moved to target MME 130-2 via direct signaling to UE 110-1, source MME 130-1 may move UE 110-1 to target MME 130-2, via a handover procedure (e.g., via the S1 handover-like procedure) and without interrupting the ongoing session (e.g., UE's 110-1 active state 320). UE 110-1 may remain in an active state (e.g., an ECM connected mode) and may be connected to target MME 130-2 and serving GW 140-2, as indicated by reference number 350.

Returning to FIG. 7, it may be determined that the UE can be moved via direct signaling to the UE (block 750), and the UE may be moved to the target device via direct signaling to the UE (block 760). For example, in embodiments described above in connection with FIGS. 5A and 5B, when UE 110-1 can be moved to target MME 130-2 via direct signaling to UE 110-1, source MME 130-1 may move UE 110-1 to target MME 130-2, via direct signaling to UE 110-1 and without interrupting the ongoing session (e.g., UE's 110-1 active state 520). UE 110-1 may remain in an active state (e.g., an ECM connected mode) and may be connected to target MME 130-2 and serving GW 140-2, as indicated by reference number 570.

Process block 740 may include the process blocks depicted in FIG. 8. As illustrated in FIG. 8, process block 740 may include forwarding a relocation request, associated with the UE, to the target device (block 800), and receiving, from the target device, a relocation response that accepts the relocation request (block 810). For example, in embodiments described above in connection with FIGS. 3A and 3B, source MME 130-1 may provide relocation request 330 to target MME 130-2. Relocation request 330 may include information indicating that source MME 130-1 wants to move UE 110-1 to target MME 130-2, information associated with UE 110-1 (e.g., a load associated with UE 110-1), etc. Target MME 130-2 may receive relocation request 330, and may determine whether it can accept the move of UE 110-1 to target MME 130-2 based on relocation request 330. In one example, target MME 130-2 may negotiate a move of UEs 110 with source MME 130-1. If target MME 130-2 can accept the move of UE 110-1, target MME 130-2 may provide relocation response 340 (e.g., indicating that target MME 130-2 can accept the move of UE 110-1) to source MME 130-1. Source MME 130-1 may receive relocation response 340, and may move UE 110-1 to target MME 130-2 based on relocation response 340.

As further shown in FIG. 8, process block 740 may include providing, to a source eNB associated with the UE, a handover command instructing the UE to handover to a target eNB (block 820), and receiving, from the target device, a relocation complete notification when the UE completes the handover to the target eNB (block 830). For example, in embodiments described above in connection with FIG. 4, source MME 130-1 may send handover command message 416 to source eNB 120-1 and source eNB 120-1 may forward 418 handover command message 416 to UE 110-1. Upon reception of handover command message 416, UE 110-1 may remove any EPS bearers for which it did not receive corresponding EPS radio bearers in target eNB 120-2. After UE 110-1 has successfully synchronized to target eNB 120-2, UE 110-1 may send handover confirm message 420 to target eNB 120-2. Target eNB 120-2 may send handover notify message 422 to target MME 130-2. Target MME 130-2 may send forward relocation complete notification message 424 to source MME 130-1.

Process block 760 may include the process blocks depicted in FIG. 9. As illustrated in FIG. 9, process block 760 may include providing, to the target device, a UE move request (block 900), receiving, from the target device, acknowledgement of the UE move request (block 910), transferring, to the target device, user context associated with the UE (block 920), and receiving, from the target device, acknowledgement of the transferred user context (block 930). For example, in embodiments described above in connection with FIG. 6, source MME 130-1 may send UE move request message 605 to target MME 130-2. UE move request message 605 may include information requesting a move of UE 110-1 to target MME 130-2. Target MME 130-2 may reply to UE move request message 605 with UE move request acknowledgement message 610. If UE move request acknowledgement message 610 indicates that target MME 130-2 can accept UE 110-1, then source MME 130-1 may send UE move transfer user context message 615 to target MME 130-2. Target MME 130-2 may send transfer user context acknowledgement message 645 to source MME 130-1. Transfer user context acknowledgement message 645 may include a cause, a target to source transparent container, a serving GW change indication, an EPS bearer setup result, addresses, TEIDs, etc.

As further shown in FIG. 9, process block 760 may include informing the UE of the move to the target device (block 940), providing, to an eNB associated with the UE, a UE context release command (block 950), and receiving, from the eNB, information indicating completion of the UE context release (block 960). For example, in embodiments described above in connection with FIG. 6, source MME 130-1 may inform UE 110-1 (e.g., as indicated by reference number 650) of the move to target MME 130-2, and target MME 130-2 may inform UE 110-1 (e.g., as indicated by reference number 655) of the move. Source MME 130-1 may provide UE context release command message 670 (e.g., requesting release of UE 110-1 context) to source eNB 120-1. Source eNB 120-1 may release UE 110-1 context and may provide UE context release complete command 675 to source MME 130-1.

Systems and/or methods described herein may move a UE, while the UE is in an active mode, between two MMEs in a way that causes no (or minimal) service interruption for the moved UE and thus does not affect the user experience. When the systems and/or methods relocate a UE (e.g., due to load balancing), the UE may keep using the same radio resources (e.g., UE may maintain a connection with a particular eNB), but a MME and/or a serving gateway (GW) associated with the UE might change. Once the UE is moved to the target MME, the eNB (e.g., associated with the UE) and the UE may be informed of the move so that the eNB and the UE may update their respective contexts. If a serving GW (e.g., associated with the UE) changes, the systems and/or methods may establish a forwarding path between a source serving GW (e.g., a serving GW from which the UE is moved) and a target serving GW (e.g., a serving GW to which the UE is moved).

The systems and/or methods may move the UE (e.g., to the target MME) in one of two ways. If the UE cannot be moved to the target MME via direct signaling to the UE, the systems and/or methods may move the UE to the target MME via a handover-like procedure initiated by the source MME. If the UE can be moved to the target MME via direct signaling to the UE, the systems and/or methods may move the UE to the target MME via direct signaling between the MME (e.g., and the eNB associated with the UE) and the UE.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a network that includes a source device provided in a pool of devices, the method comprising:
   determining, by the source device, a user equipment, associated with the source device, to move to a target device provided in the pool of devices, where the user equipment has an ongoing session;
   determining, by the source device, whether the user equipment can be moved to the target device via direct signaling to the user equipment;
   moving, by the source device, the user equipment to the target device, via a handover procedure and without interrupting the ongoing session, when the user equipment cannot be moved to the target device via direct signaling to the user equipment; and
   moving, by the source device, the user equipment to the target device, via direct signaling to the user equipment and without interrupting the ongoing session, when the user equipment can be moved to the target device via direct signaling to the user equipment.

2. The method of claim 1, where each of the source device and the target device includes a mobility management entity (MME) provided in a pool of MMEs.

3. The method of claim 1, further comprising:
   selecting the target device to which to move the user equipment based on a load balancing performed by the pool of devices.

4. The method of claim 1, where moving the user equipment to the target device via a handover procedure comprises:
   forwarding, to the target device, a relocation request associated with the user equipment,
   receiving, from the target device, a relocation response that accepts the relocation request,
   providing, to a source eNodeB associated with the user equipment, a handover command instructing the user equipment to handover to a target eNodeB associated with the target device, and
   receiving, from the target device, a relocation complete notification when the user equipment completes the handover to the target eNodeB.

5. The method of claim 4, where the relocation request includes one or more of:
   target cell identification information,
   radio access bearer identification information,
   radio resource control information, or
   history information associated with the user equipment.

6. The method of claim 4, where the relocation request indicates that moving the user equipment to the target device is based on load balancing.

7. The method of claim 1, where moving the user equipment to the target device via direct signaling to the user equipment comprises:
   providing, to the target device, a user equipment move request,
   transferring, to the target device, a user context associated with the user equipment,
   informing the user equipment of the move to the target device,
   providing, to an eNodeB associated with the user equipment, a user equipment context release command, and
   receiving, from the eNodeB, information indicating completion of the user equipment context release.

8. The method of claim 7, where moving the user equipment to the target device via direct signaling to the user equipment further comprises:
   receiving, from the target device, acknowledgment of the user equipment move request, and
   receiving, from the target device, acknowledgment of the transferred user context.

9. The method of claim 8, where the acknowledgment of the user equipment move request indicates that the target device can accept the user equipment.

10. The method of claim 7, where the user context includes one or more of:
    an international mobile subscriber identity (IMSI) associated with the user equipment,
    a security context associated with the user equipment,
    a network capability associated with the user equipment, or
    an aggregate maximum bit rate (AMBR) associated with the user equipment.

11. The method of claim 1, where the user equipment is in an evolved packet system (EPS) connection management (ECM) connected mode.

12. A device in a network that includes a pool of other devices associated with the device, the device comprising:
    a memory to store a plurality of instructions; and
    a processor to execute instructions in the memory to:

determine a user equipment, associated with the device, to move to a target device provided in the pool of other devices, where the user equipment has an ongoing session, move the user equipment to the target device, via a handover procedure and without interrupting the ongoing session, when the user equipment cannot be moved to the target device via direct signaling to the user equipment, and move the user equipment to the target device, via direct signaling to the user equipment and without interrupting the ongoing session, when the user equipment can be moved to the target device via direct signaling to the user equipment.

13. The device of claim 12, where the device includes a mobility management entity (MME) and each of the other devices includes a MME.

14. The device of claim 12, where the user equipment is active between the device and the target device, and moving the user equipment to the target device causes substantially no service interruption for the user equipment.

15. The device of claim 12, where, when moving the user equipment to the target device via a handover procedure, the processor is further to execute instructions in the memory to:
forward, to the target device, a relocation request associated with the user equipment,
receive, from the target device, a relocation response that accepts the relocation request,
provide, to a source eNodeB associated with the user equipment, a handover command instructing the user equipment to handover to a target eNodeB associated with the target device, and
receive, from the target device, a relocation complete notification when the user equipment completes the handover to the target eNodeB.

16. The device of claim 15, where the relocation request includes one or more of:
target cell identification information,
radio access bearer identification information,
radio resource control information,
history information associated with the user equipment, or
an indication that moving the user equipment to the target device is based on the load balancing.

17. The device of claim 12, where, when moving the user equipment to the target device via direct signaling to the user equipment, the processor is further to execute instructions in the memory to:
provide, to the target device, a user equipment move request,
transfer, to the target device, a user context associated with the user equipment,
inform the user equipment of the move to the target device,
provide, to an eNodeB associated with the user equipment, a user equipment context release command, and
receive, from the eNodeB, information indicating completion of the user equipment context release.

18. The device of claim 17, where, when moving the user equipment to the target device via direct signaling to the user equipment, the processor is further to execute instructions in the memory to:
receive, from the target device, acknowledgment of the user equipment move request, where the acknowledgment of the user equipment move request indicates that the target device can accept the user equipment, and
receive, from the target device, acknowledgment of the transferred user context.

19. The device of claim 17, where the user context includes one or more of:
an international mobile subscriber identity (IMSI) associated with the user equipment,
a security context associated with the user equipment,
a network capability associated with the user equipment, or
an aggregate maximum bit rate (AMBR) associated with the user equipment.

20. A system, comprising:
a source mobility management entity (MME) to:
serve a user equipment with an ongoing session,
determine that the user equipment is to be moved to a target mobility management entity,
determine whether the user equipment can be moved to the target mobility management entity via direct signaling to the user equipment,
move the user equipment to the target mobility management entity, via a handover procedure and without interrupting the ongoing session, when the user equipment cannot be moved to the target mobility management entity via direct signaling to the user equipment, and
move the user equipment to the target mobility management entity, via direct signaling to the user equipment and without interrupting the ongoing session, when the user equipment can be moved to the target mobility management entity via direct signaling to the user equipment; and
the target mobility management entity to:
accept the move of the user equipment, and
serve the user equipment.

21. The system of claim 20, where the user equipment is in an evolved packet system (EPS) connection management (ECM) connected mode.

22. The system of claim 20, where, when moving the user equipment to the target mobility management entity via a handover procedure, the source mobility management entity is further to:
forward, to the target mobility management entity, a relocation request associated with the user equipment,
receive, from the target mobility management entity, a relocation response that accepts the relocation request,
provide, to a source eNodeB associated with the user equipment, a handover command instructing the user equipment to handover to a target eNodeB associated with the target mobility management entity, and
receive, from the target device, a relocation complete notification when the user equipment completes the handover to the target eNodeB.

23. The system of claim 20, where, when moving the user equipment to the target mobility management entity via direct signaling to the user equipment, the source mobility management entity is further to:
provide, to the target mobility management entity, a user equipment move request,
transfer, to the target mobility management entity, a user context associated with the user equipment,
inform the user equipment of the move to the target mobility management entity,
provide, to an eNodeB associated with the user equipment, a user equipment context release command, and
receive, from the eNodeB, information indicating completion of the user equipment context release.

24. The system of claim 23, where, when moving the user equipment to the target device via direct signaling to the user equipment, the source mobility management entity is further to:

receive, from the target mobility management entity, acknowledgment of the user equipment move request, where the acknowledgment of the user equipment move request indicates that the target mobility management entity can accept the user equipment, and receive, from the target mobility management entity, acknowledgment of the transferred user context.

25. The system of claim 23, where the user context includes one or more of:

an international mobile subscriber identity (IMSI) associated with the user equipment, a security context associated with the user equipment, a network capability associated with the user equipment, or an aggregate maximum bit rate (AMBR) associated with the user equipment.

* * * * *

UNITED STATES PATENT AND TRADEMARK OFFICE
CERTIFICATE OF CORRECTION

PATENT NO. : 8,331,938 B2
APPLICATION NO. : 12/623828
DATED : December 11, 2012
INVENTOR(S) : Meirosu et al.

It is certified that error appears in the above-identified patent and that said Letters Patent is hereby corrected as shown below:

In Column 8, Line 30, delete "SLAP" and insert -- S1AP --, therefor.

In Column 15, Line 4, delete "51" and insert -- S1 --, therefor.

Signed and Sealed this
Ninth Day of April, 2013

Teresa Stanek Rea
*Acting Director of the United States Patent and Trademark Office*